United States Patent
Nash et al.

(10) Patent No.: US 8,988,968 B2
(45) Date of Patent: Mar. 24, 2015

(54) SEISMIC CABLE STRUCTURE

(75) Inventors: Philip Nash, Guildford (GB); Michael Henshaw, Chepstow (GB)

(73) Assignee: TGS Geophysical Company (UK) Limited, Godalming (GB)

( * ) Notice: Subject to any disclaimer, the term of this patent is extended or adjusted under 35 U.S.C. 154(b) by 901 days.

(21) Appl. No.: 12/663,483

(22) PCT Filed: May 23, 2008

(86) PCT No.: PCT/GB2008/001764
§ 371 (c)(1),
(2), (4) Date: Dec. 7, 2009

(87) PCT Pub. No.: WO2008/149059
PCT Pub. Date: Dec. 11, 2008

(65) Prior Publication Data
US 2010/0182872 A1   Jul. 22, 2010

(30) Foreign Application Priority Data
Jun. 8, 2007   (GB) .................................. 0711129.7

(51) Int. Cl.
*G01V 1/38* (2006.01)
*G01H 9/00* (2006.01)
*G01V 1/20* (2006.01)

(52) U.S. Cl.
CPC ............... *G01H 9/004* (2013.01); *G01V 1/201* (2013.01)
USPC ................... 367/20; 385/12; 385/24; 398/79; 398/82

(58) Field of Classification Search
CPC ....... G01H 9/004; G01V 1/201; G01V 1/226; G01V 1/202; G01V 1/208; G01V 1/22; G01D 5/35383; E21B 47/123; H04B 10/40; H04L 25/4904; G02B 6/4429; G02B 6/4494; G02B 6/4464; G02B 6/447

USPC ........... 340/870.13, 870.14; 367/79, 149, 20, 367/64; 370/4, 100; 385/113, 12, 24, 103; 398/47, 51, 53, 54, 77, 79, 82, 102; 439/320, 475

See application file for complete search history.

(56) References Cited

U.S. PATENT DOCUMENTS 4,628,493 A   12/1986   Nelson et al.
5,696,857 A *  12/1997   Frederick .................... 385/12

(Continued)

FOREIGN PATENT DOCUMENTS

GB   2087680 A *  5/1982  ............... H04B 9/00
GB   2 329 722 A   3/1999

(Continued)

*Primary Examiner* — Daniel L Murphy
(74) *Attorney, Agent, or Firm* — Finnegan, Henderson, Farabow, Garrett & Dunner LLP (57) ABSTRACT

There is described an optical seismic cable (2) comprising a number of sensor units (5) spaced along the length of the cable and a number of connection units (4) spaced along the length of the cable, the cable further comprising a number of first optical fibers extending substantially continuously along the cable from one connection unit to the next, and a number of second optical fibers which each extend part-way along the cable between adjacent connection units, and wherein at each connection unit at least one first optical fiber is joined to a second optical fiber, and wherein at the sensor units sensors are joined to said second optical fibers. A second aspect of the invention provides an optical seismic cable module (3) comprising a number of first optical fibers extending substantially continuously from one end of the cable module to the other, and a number of second optical fibers which each extend part-way along the cable module, the seismic cable module further comprising at one end a connection unit at which at least one first optical fiber is joined to a second optical fiber, and a number of sensor units at which sensors are joined to second optical fibers.

10 Claims, 7 Drawing Sheets

(56) References Cited

U.S. PATENT DOCUMENTS

| | | | |
|---|---|---|---|
| 6,365,891 B1 | 4/2002 | Hodgson et al. | |
| 6,609,840 B2 * | 8/2003 | Chow et al. | 398/102 |
| 6,827,597 B1 * | 12/2004 | Metzbower et al. | 439/320 |
| 2004/0037522 A1 * | 2/2004 | Sutehall et al. | 385/113 |
| 2005/0174887 A1 * | 8/2005 | Nash et al. | 367/149 |

FOREIGN PATENT DOCUMENTS

| | | |
|---|---|---|
| GB | 2 417 627 A | 3/2006 |
| GB | 2 420 177 A | 5/2006 |
| WO | WO 99/28713 | 6/1999 |
| WO | WO 2005/114285 A1 | 12/2005 |

\* cited by examiner

SEISMIC CABLE STRUCTURE

The present invention relates to seismic survey apparatus, and is particularly concerned with a modular structure for seismic survey cables which are intended to be deployed over an area of interest and remain there for some years. The seismic survey cables gather data using optical sensing techniques, and by periodically interrogating the sensors of the array and comparing present and previous results, changes in the underlying structure can be determined. The fibre optic seismic array is primarily intended for monitoring changes in undersea oilfield resource distribution and content over time.

In order to deploy an array of sensors over an area of interest, a number of cables are typically laid in parallel lines stretching across the area, with a predetermined spacing between the parallel cables. Each cable has a number of sensor units spaced along its length, each sensor unit comprising a number of individual sensing devices for detecting acceleration and pressure. In a so-called "4C" sensor unit, four sensors are provided in each sensor unit. Three sensors measure accelerations in three orthogonal directions and the fourth sensor is a pressure transducer or hydrophone.

Optical fibre measurement techniques in seismic surveying are well known, both for measurements of pressure and of acceleration.

In conventional optical fibre pressure sensors, an optical fibre coil is wrapped around a flexible former which deforms as external pressure increases, compressing the coil of fibre. This compression shortens the optical length of the fibre, and enables measurement of pressure using a comparison of phase between synchronised light pulses which respectively have and have not passed through the compressed coil.

A linear accelerometer based on optical fibre technology is known in which a sensing mass is supported for axial movement on one end of an elastomeric strut, and a fibre optic coil is wound round the strut. A linear acceleration is sensed when an axial acceleration is applied to the other end of the strut, the change in diameter as the strut is compressed or stretched causing a change in optical path length of the optical fibre coil. This change in optical path length is sensed using a comparison of phase between synchronised light pulses which respectively have and have not passed through the compressed coil.

In an optical seismic survey cable, a typical "4C" sensor unit contains 3 fibre optic accelerometers and one fibre optic pressure sensor or "hydrophone". The three accelerometers are usually arranged orthogonally, although other arrangements might be used in some instances. The accelerometers are mounted inside a waterproof housing which may be filled with an inert dry gas. The hydrophone is located outside the housing so that it is exposed to ambient pressure.

The optical fibre coils of the four sensors of each sensor unit are connected in series, on an optical fibre which has a signal input/output end and a reflective end. At the reflective end, a mirror or other reflective element is arranged so that light reaching the reflective end is reflected back through the fibre and sensors to the input/output end. Additionally, four further mirrors are coupled to the fibre at locations between each two adjacent sensors, and between the first sensor and the input/output end.

With this arrangement, a single pulse of light applied at the input/output end travels along the fibre and arrives at a first coupler, where a part of the light is split off and directed to a first mirror, while the remainder of the light passes on through the fibre optic coil of the first sensor. The light directed to the first mirror is reflected back to the first coupler and is directed back along the optical fibre to the input/output end, where it appears as a first return pulse.

The light which passes through the coil of the first sensor then meets a second coupler, in which part of the light is again split off and directed toward a second mirror. The light reflected at this second mirror passes back through the first sensor coil and continues to the input/output end, where it forms a second return pulse. The light which has passed through the first sensor coil and is not split off at the second coupler passes through the fibre optic coil of the second sensor, and meets a third coupler. In a similar fashion to that described above, part of the light is again split off, reflected at a third mirror, and returns through the coils of the first and second sensors to form a third return pulse at the input/output end. In a sensor unit in which four sensing coils are disposed, there will be five reflecting devices, and thus a single pulse of light applied to the input/output end of the fibre will result in a train of five return pulses, one from each reflector. The optical lengths of the sensor coils are typically similar, so that the returning pulses are evenly spaced in time.

In order to make measurements of the states of the fibre optic coils of the sensors, two pulses are applied to the input/output end of the fibre. The time interval between the two input pulses is arranged to be substantially the same as the time interval taken for light to pass along the fibre from one reflector to the next, and back, i.e. the interval between the return pulses from a single input pulse. Thus, as light from the first pulse which has passed through the first sensor coil and been reflected at the second mirror returns to the input/output end of the fibre (i.e. the second return pulse from the first input pulse), then at the same time light from the second input pulse which has passed to the first mirror, and has not been through the first sensor coil (i.e. the first return pulse from the second input pulse), also arrives back at the input/output end of the fibre, where the two returning pulses are superimposed to form an interference. From this interference, the phase difference between the two pulses can be measured. This phase difference is due to the state of the sensor coil, and is therefore representative of the instantaneous pressure or acceleration being sensed by the sensor coil at the time the first light pulse passed through it.

As will be understood from the above explanation, a single input sensing pulse pair will give rise to a returning pulse train from each sensor unit. The returning pulse trains from each sensor unit must be able to be separately interrogated, and this imposes a limit on the number of pulse trains which can be accommodated in a single fibre and kept separate. This in turn limits the number of sensor units which a single fibre may accommodate.

In a large seismic array, a large number of sensor units are deployed, and a single interrogating pulse pair will give rise to a returning pulse train from each sensor. Returning pulses from different sensor units may be interleaved, by the use of delay coils at appropriate positions. There is therefore a need to provide a structure for a seismic cable using optical fibre sensing techniques in which the sensors are connected into the cable in a manner which minimises the number of fibres required to carry the returning pulse trains to the signal processing equipment which correlates the sensor results into meaningful seismic data.

Furthermore, at each joint between optical fibres there is a loss of energy in the signals passing through the fibres, and thus a further consideration addressed in the design of optical fibre arrays is to minimise the number of joints in signal fibres.

An objective of the present invention is to provide a structure for an optical seismic cable in which a number of sensor units may be connected to the cable with an efficient use of the individual fibres provided in the cable.

A further objective is to provide an optical seismic cable in which optical fibres which extend from one end of the cable to the other have a minimum of joints. Preferably, at least one fibre extends from one end of the module to the other without a break.

Further objectives are to minimise the number of units attached to the fibre optic cable, and to reduce the complexity of connections between modules.

In one embodiment, the seismic cable comprises a substantially tubular strength element, a number of core fibres extending along the lumen of the strength element, and a number of outer fibres extending in tubes radially outward of the strength element, the strength element and the outer fibres being contained within a cable sheath. A further objective of the present invention is to minimise number of fibre connections to core fibres in such a cable, so minimising the number of breaks in the strength element made along the length of the seismic cable.

According to a first aspect of the invention, there is provided an optical seismic cable comprising a number of sensor units spaced along the length of the cable and a number of connection units spaced along the length of the cable, the cable further comprising a number of first optical fibres extending substantially continuously along the cable from one connection unit to the next, and a number of second optical fibres which each extend part-way along the cable between adjacent connection units, and wherein at each connection unit at least one first optical fibre is joined to a second optical fibre, and wherein at the sensor units sensors are joined to said second optical fibres.

In one embodiment, there is provided an optical seismic cable comprising a substantially tubular strength element, a number of core fibres extending along the lumen of the strength element, and a number of outer fibres extending in tubes radially outward of the strength element, the seismic cable further comprising a number of connection points at which the strength element is broken and core fibres are joined to outer fibres, and a number of sensor points at which sensor units are joined to outer fibres.

In one embodiment, there is provided a modular optical seismic cable in which a number of cable modules are joined end-to-end, with each module comprising a connection point at which the strength element is broken and core fibres are joined to outer fibres, and a number of sensor points where sensor units are joined to outer fibres. The two ends of each module are preferably provided with joining devices which provide a load path between the strength elements of adjacent cable modules, and provide for the connection of the core fibres between adjacent modules.

In one embodiment of the modular optical seismic cable, the connection point may be at one end of the module. In an embodiment, the connection point may be integrated with a joining device, and the joining device may provide for connection between core fibres of adjacent modules and outer fibres of adjacent modules.

In one embodiment of the modular optical seismic cable, the connection point may also be a sensor point.

In one embodiment of the modular optical seismic cable, the connection point may be intermediate the length of the module, preferably with equal numbers of sensor points on each side of the connection point. Joining devices at the respective ends of such a module may provide for module-to-module connection of core fibres, and optionally also for module-to-module connection of outer fibres.

According to a second aspect of the invention, there is provided an optical seismic cable module comprising a number of first optical fibres extending substantially continuously from one end of the cable module to the other, and a number of second optical fibres which each extend part-way along the cable module, the seismic cable module further comprising at one end a connection unit at which at least one first optical fibre is joined to a second optical fibre, and a number of sensor units at which sensors are joined to second optical fibres. The first fibres may be core fibres and the second fibres may be outer fibres, in a cable structure as set out immediately above. Alternatively, the cable structure may be such that all fibres are positioned radially outboard of a central strength element, with some of the fibres designated as "first fibres" and extending uninterrupted from one end of the module to the other.

In a third aspect of the invention, there is provided an optical seismic cable module comprising a number of first optical fibres extending along the cable module, and a number of second optical fibres which each extend part-way along the cable module, and a number of sensor units at which sensors are joined to the second optical fibres, the seismic cable module further comprising a connection unit intermediate the length of the module at which one or more first optical fibres are joined to one or more second optical fibres, each of the first optical fibres extending continuously between the connection unit and a respective end of the module.

Embodiments of the present invention will now be described in detail with reference to the accompanying drawings, in which.

Figure 1:
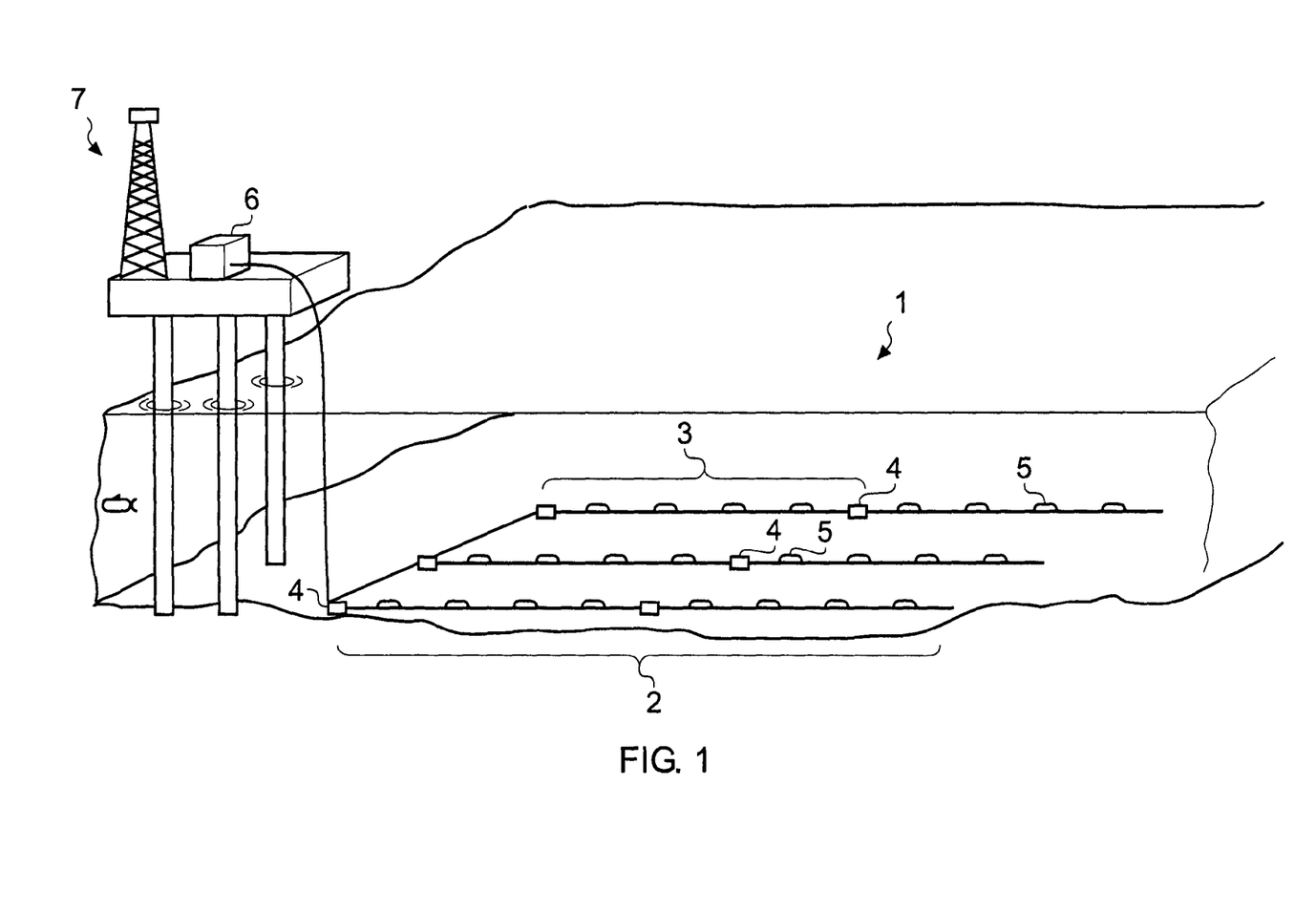
FIG. 1 is a schematic perspective view of an undersea seismic array.

Referring now to the figures, FIG. 1 is a schematic view showing a seismic array deployed on the seabed. The seismic array 1 comprises a number of seismic cables 2 laid in substantially parallel lines on the seabed. Each seismic cable 2 comprises a number of cable modules 3 joined end-to-end by joint elements 4. At intervals along each cable module 3, sensing units 5 are provided. Each sensing unit 5 includes accelerometers and a pressure transducer to detect seismic vibrations in the seabed, and hydrostatic shock waves in the seawater. The sensing units 5 are connected to an operating system 6 via optical fibres within the seismic cables 2. In the illustrated embodiment, the operating system 6 is housed on a platform 7, but the operating system may, for example, be provided on a ship, or on dry land if the area of interest is close enough inshore. The operating system 6 may be permanently attached to the seismic cables 2 of the array 1. Alternatively, the operating system 6 may be releasably connected to the seismic array 1, so that the same operating system may be transported and selectively connected to a number of different seismic arrays. The operating system 6 provides input light pulses which are led to the sensors within the sensing units 5, and receives and correlates the returning pulse trains to provide seismic data relating to the strata underlying the seismic array 1. The exact nature of the operating system 6 lies outwith the ambit of the present application, and will not be described in detail.

Figure 3:
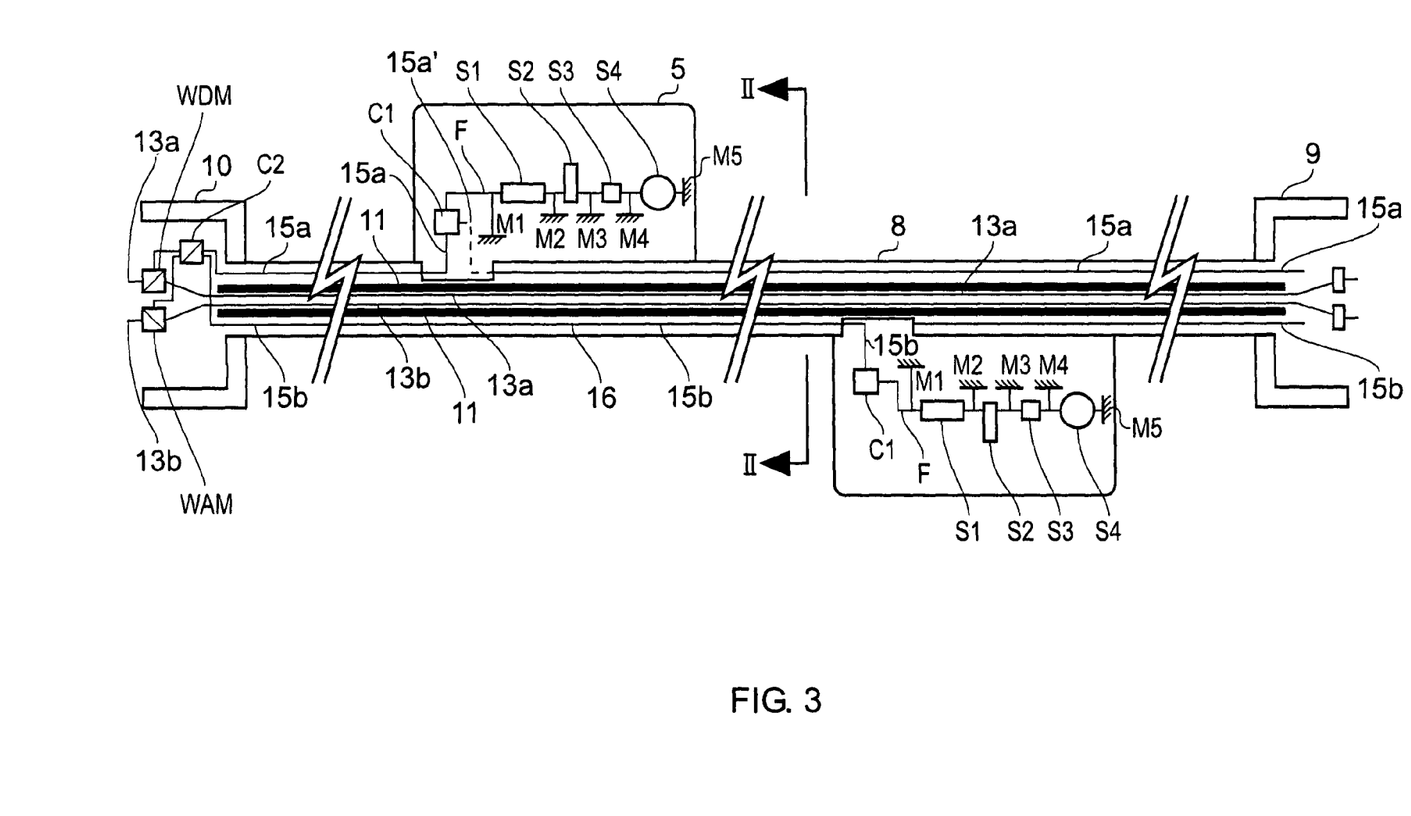
FIG. 3 is a schematic view of a first seismic cable module.

Each of the seismic cables 2 in the seismic array 1 is formed by a number of cable modules 3, joined end-to-end. FIG. 3 shows an example of a cable module according to a first embodiment of the invention. Referring now to FIG. 3, the cable module 3 comprises a length of optical fibre cable 8, having at one end (the right-hand end as seen in the figure) a joining element 9. At the other end of the cable 8 is a combined joining element and connection element 10. The joining element 9 is adapted to be attached to the combined joining and connection element 10 of another module, in order to connect two or more cable modules 3 together to form a seismic cable 2. Spaced along the length of the fibre optic cable 8 are a number of sensor units 5, each of which houses four sensors.

Figure 2:
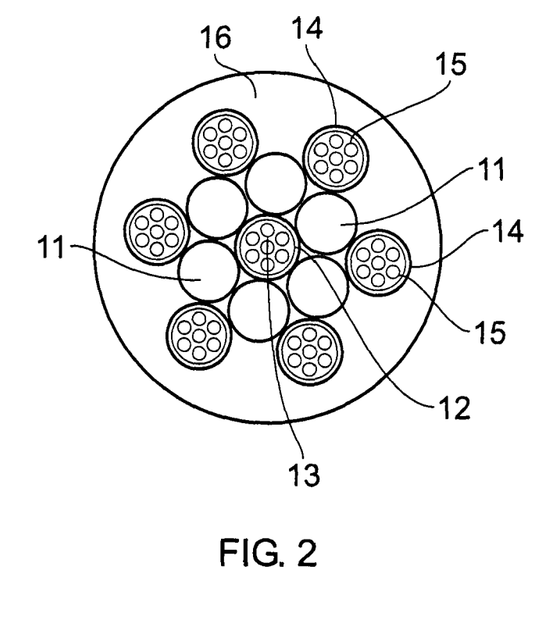
FIG. 2 is a cross-sectional view of the seismic cable.

The optical fibre cable 8 is shown in cross-section in FIG. 2. The cable is generally circular in cross-section, and has a number of strength elements 11 running longitudinally through it. In this embodiment, the strength element is in the form of a laid wire, but on the strength element may alternatively be a number of untwisted metal fibres, or a number of fibres of a high-strength synthetic material.

Centrally within the twisted wire strength elements 11 is a core tube 12 which contains a number of core optical fibres 13. Outside the twisted wire strength elements 11, a plurality of outer fibre tubes 14 run along the cable, each of the outer fibre tubes 14 containing a number of outer optical fibres 15. The outer fibre tubes 14 are encased within an outer covering 16, which may include armoured layers and protective waterproofing layers.

Figure 4:
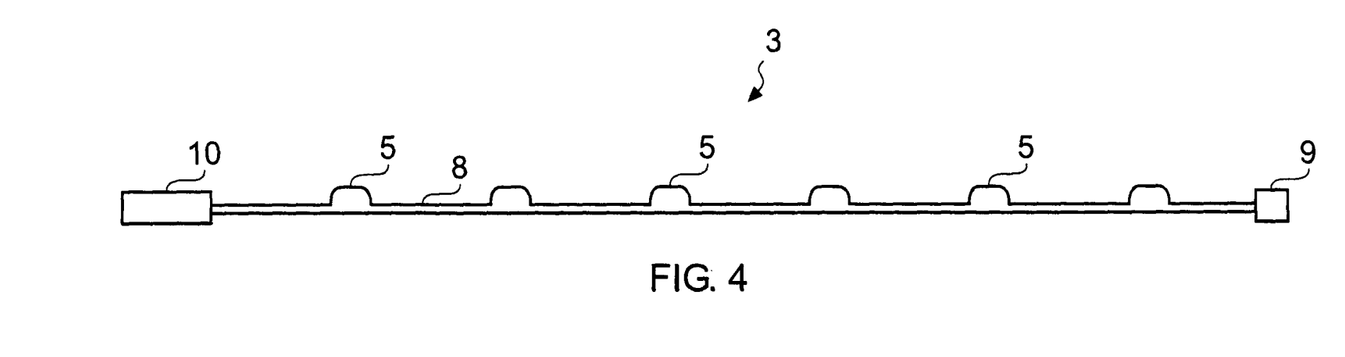
FIG. 4 is a schematic longitudinal sectional view of the cable module of FIG. 3, illustrating the connection between the fibres.

FIG. 4 is a schematic longitudinal sectional view of the cable module 3 of FIG. 3. In FIG. 4, only two of the sensor units 5, two of the core fibres 13a and 13b and two of the outer fibres 15a and 15b are shown.

Each of the sensor units 5 houses four sensors S1 to S4, and five reflectors M1 to M5, all coupled to an optical fibre F by respective couplers (not shown, for clarity). The input/output end of the optical fibre F is attached by a coupler C1 to one of the outer fibres 15a or 15b of the cable 8. The reflectors M1 to M5 may either be a simple cleaved and mirrored fibre end, or may be a more complicated component such as a Bragg grating. The split ratios of the respective couplers are preferably chosen so that the energy of the optical signal leaving the sensor unit from each reflector is the same.

In the embodiment shown, each sensor unit 5 is connected to a respective one of the outer fibres 15a, 15b of the cable 8. At the position of the sensor unit 5, the covering material 16 of the cable is cut back, without severing the strength elements 11, and the tube 14 containing the outer fibre 15a is cut to expose the outer fibre. The sensor unit 5 may be attached to the exposed strength elements, for example by bonding. The outer fibre 15a is then led to a coupler C1 where it is joined to the optical fibre F of the sensor unit 5. In cases where only one sensor unit is joined to each fibre, then a simple fused joint may be used instead of the coupler C1.

The coupler C1 is a bidirectional device having a number of inputs and a number of outputs. In operation, a light pulse arriving at one of the inputs produces an output light pulse at each of the outputs, and a light pulse arriving at one of the outputs produces an output light pulse from each of the inputs.

As is apparent from the figure, the strength elements 11 of the cable 8 extended continuously from one end of the module to the other. The strength elements 11 are attached to the joining element 9 and to the combined joining element and connection element 10. When the joining element 9 of one module is attached to the combined joining element and connection element 10 of an adjacent module, the connection is such as to be able to transmit tensile force from the strength elements 11 of one module through to the strength elements 11 of the next adjacent cable module. As with the strength elements 11, the core fibres 13a and 13b extend uninterrupted from one end of the module to the other.

At the combined connection and joining element 10, a coupler such as a wavelength drop multiplexer WDM is connected to the core fibre 13a, and provides an output to a coupler C2 which in turn provides an output to each outer fibre. Coupler C2 is also connected to the core fibre 13b by a wavelength add multiplexer WAM.

A wavelength drop multiplexer is a particular form of coupler, which responds only to a predetermined wavelength of light. In order further to increase the information carrying capacity of the core fibre 13b, synchronised light pulses of a number of different wavelengths are sent down the core fibre 13a. At the wavelength drop multiplexer, light of a predetermined wavelength is detected and produces output pulses of that wavelength from the outputs of the wavelength drop multiplexer. In a wavelength add multiplexer operating at a predetermined wavelength, input pulses of that wavelength arriving at the inputs of the wavelength add multiplexer are added to light pulses of other wavelengths passing along core fibre 13b.

The arrangement is such that when a light pulse is output by the wavelength drop multiplexer WDM to coupler C2, the light pulse is sent to both outer fibres 15a and 15b by coupler C2. Pulses then travel along the respective outer fibres 15a and 15b until they reach the respective couplers C1 of the respective sensor units 5a and 5b connected to those outer fibres. Since the distance to the sensor unit 5a on fibre 15a is considerably shorter than the distance along the cable 8 to the sensor unit 5b on fibre 15b, the pulse train returning along fibre 15a will reach the coupler C2 well before the returning pulse train travelling back along outer fibre 15b from sensor unit 5b. A delay coil (not shown) may be inserted in outer fibre 15b to ensure correct time separation between pulse trains returning from the sensors of 5a and 5b. As the pulse trains arrive at coupler C2, they are output to the wavelength add multiplexer WAM and fed into the core fibre 13b to return along the cable 8 to the operating system 6.

The sensor units 5a, 5b of one cable module 3 in this embodiment form a "sector" of the array, in that all of the sensor units of a sector are connected to the core fibre 13a at the same point. The sensor units of a sector all produce returned pulse trains which are reflections of the same pair of input pulses, and thus there is a relationship between the number of sensor units in each sector, the interval between each successive pulse pair, and the time taken for all of the sensor units to return their pulse trains to the connection point with the core fibre 13a. For a given geometry and spacing of sensor units, there will be a maximum frequency (or minimum interval) between successive pairs of input pulses, since each pulse pair cannot be sent until all of the return pulses from the previous pulse pair have been received.

As will be seen in FIG. 4, the connections between adjacent cable modules include connections of the core fibres 13a and 13b, but the outer fibres 15a and 15b of each module are not connected to the outer fibres of adjacent modules. In a seismic cable 8 made up of a number of these modules joined end-toend, therefore, there need to be only as many outer fibres 15 as there are sensor units 5 in a sector. In this embodiment, each module of the cable carries all the sensor units 5a, 5b of one sector, and the structure of the cable is such that there are as many outer fibres as there are sensor units in a sector. In an embodiment where there are 8 sensor units in a sector, the coupler C2 may have 2 inputs and 8 outputs, with each output being connected to a respective outer fibre 15a, 15b etc. One input will be connected to wavelength drop multiplexer WDM, and the other input to wavelength add multiplexer WAM. A sensor unit 5a, 5b etc will be connected to each respective outer fibre.

In an alternative embodiment, more than one sensor unit may be connected to the same outer fibre, and in the extreme case the sensor units of the module may all be connected in series to the same outer fibre, so that all of the sensor units of one sector are served by the same fibre. As an example, the coupler C1 may be re-joined to the outer fibre 15a as shown by the broken line section 15a', and the subsequent sensor units 5 may be similarly connected to the outer fibre 15a. The coupler C1 will then be arranged such that an input light pulse arriving from the coupler C2 will be split, and part of the light will be sent to the fibre F to produce a train of returning pulses, while part of the input light pulse is transmitted to the continuation of the outer fibre 15a to the right (as seen in the figure) of the sensor unit 5a. This part of the light pulse will then again be split at the coupler C1 of the next sensor unit, part of the light being again diverted into its fibre F to produce a second train of returning pulses. The trains of returning pulses arriving at the respective couplers C1 are returned along the outer fibre 15a to the coupler C2, and coupled into the core fibre 13b by the wavelength add multiplexer WAM for transmission to the operating system 6. With such an arrangement, the structure of the cable 8 may be made most efficient by providing a single outer fibre, to which all of the sensor units of a cable module are connected in series.

In another proposed embodiment, each sector will have 8 sensor units 5, and the coupler C2 has two inputs and four outputs. The cable is provided with four outer fibres 15a, 15b etc, each outer fibre being connected to a respective output of the coupler C2. Two sensor units are connected in series to each of the four outer fibres in the cable 8.

In operation, two pulses are sent down the core fibre 13a at a known interval. At a wavelength drop multiplexer WDM, light of the selected wavelength is split off from the core fibre 13a and is coupled to the outer fibre 15a. The two pulses pass along the outer fibre 15a, and are then fed into the fibre F of the sensor unit 5 by the coupler C1. Return pulses from each mirror M1 to M5 pass back up the fibre F, through the coupler C1 and the outer fibre 15a, and are reintroduced into the core fibre 13b by the wavelength add multiplexer WAM to travel back to the operating system 6 for analysis. Delay coils (not shown) are arranged so that the first pulse returning from the second reflector M2 overlaps with the second pulse returning from the first reflector M1, and so on, as described above. In other words, the 1st pulse returning from nth mirror overlaps with 2nd pulse returning from the (n−1)th mirror, so that the overlapped returning 1st and 2nd pulses produce interference due to a phase change representative of sensor output (pressure or acceleration) at time of the 1st pulse passing through the sensor.

Figure 5:
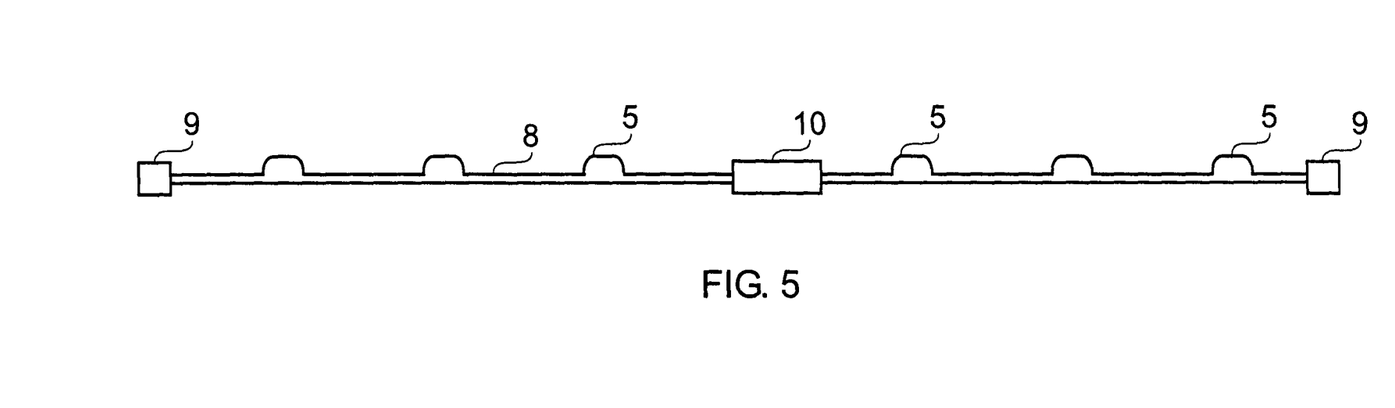
FIG. 5 is a schematic view of a second seismic cable module.
Figure 6:
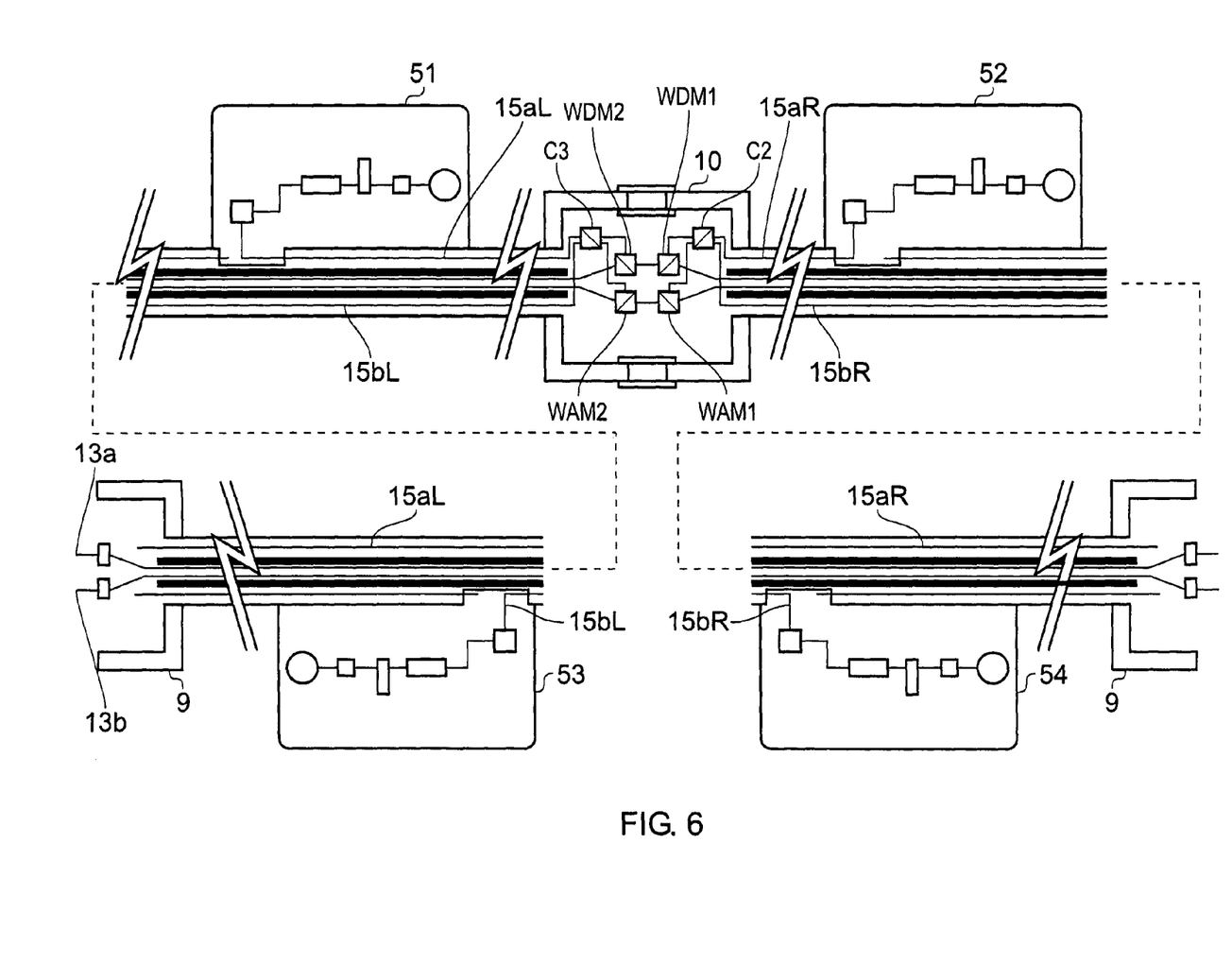
FIG. 6 is a schematic longitudinal sectional view of the cable module of FIG. 5, illustrating the connection between the fibres.

In the embodiment shown in FIG. 5 and FIG. 6, the cable module comprises two simple joining elements 9 at its ends, and has at its centre a connection element 10. The cable 8 of the module is parted at the connection element 10, and the core fibre 13a is connected to two wavelength drop multiplexers WDM1 and WDM2. The core fibre 13b is connected to two wavelength add multiplexers WAM1 and WAM2. The connection element 10 further comprises two couplers C2 and C3, each of which is connected to respective outer fibres, and to a respective one of the wavelength drop multiplexers and a respective one of the wavelength add multiplexers. In the illustrated embodiment, coupler C2 is connected to wavelength drop multiplexer WDM1 and to wavelength add multiplexer WAM1, and to outer fibres 15aR and 15bR which extend to the right from the connection unit 10, as seen in the figure. Coupler C3 is connected to wavelength drop multiplexer WDM2 and to wavelength add multiplexer WAM2, and to outer fibres 15aL and 15bL which extend to the left from the connection unit 10, as seen in the figure.

The module shown in FIG. 6 can thus accommodate, between the joining elements 9, two "sectors" of sensor units. In the example shown, sensor units 51 and 53 constitute one sector, while sensor units 52 and 54 constitute a second sector. In operation, light pulses including a plurality of wavelengths of light are sent down the core fibre 13a. At the wavelength drop multiplexer WDM2, pulses of a first wavelength are split from the core fibre 13a and are passed to coupler C3, resulting in output pulses being supplied to the outer fibres 15aL and 15bL, which route the output pulses to sensor units 51 and 53.

Returning pulse trains from the sensor units 51 and 53 arriving at coupler C3 are directed to wavelength add multiplexer WAM2, where they are coupled into the core fibre 13b for transmission back to the operating system 6.

Light signals whose wavelengths are not stripped off at multiplexer WDM2 pass on down the fibre 13a to the next wavelength drop multiplexer WDM1, where pulses of a second wavelength are split from the core fibre and directed to coupler C2. Pulses of the second wavelength are then applied to the outer fibres 15aR and 15bR, which conduct them to sensor units 52 and 54. Returning pulse trains from sensor units 52 and 54 arrive at coupler C2, where they are fed to wavelength add multiplexer WAM1 and reintroduced into the core fibre 13b for transmission back to the operating system 6.

It will be observed that, at the joining elements 9 situated at the ends of the cable module, only the core fibres 13a and 13b need to be joined to the core fibres of adjacent modules. The connection unit 10 situated at the centre of the module is pre-assembled and all jointing is done under factory conditions. Only the connections between the joining elements 9 need be made under field conditions, and since these connections are simplified, the cost of assembling a seismic cable from cable modules is reduced.

Figure 7:
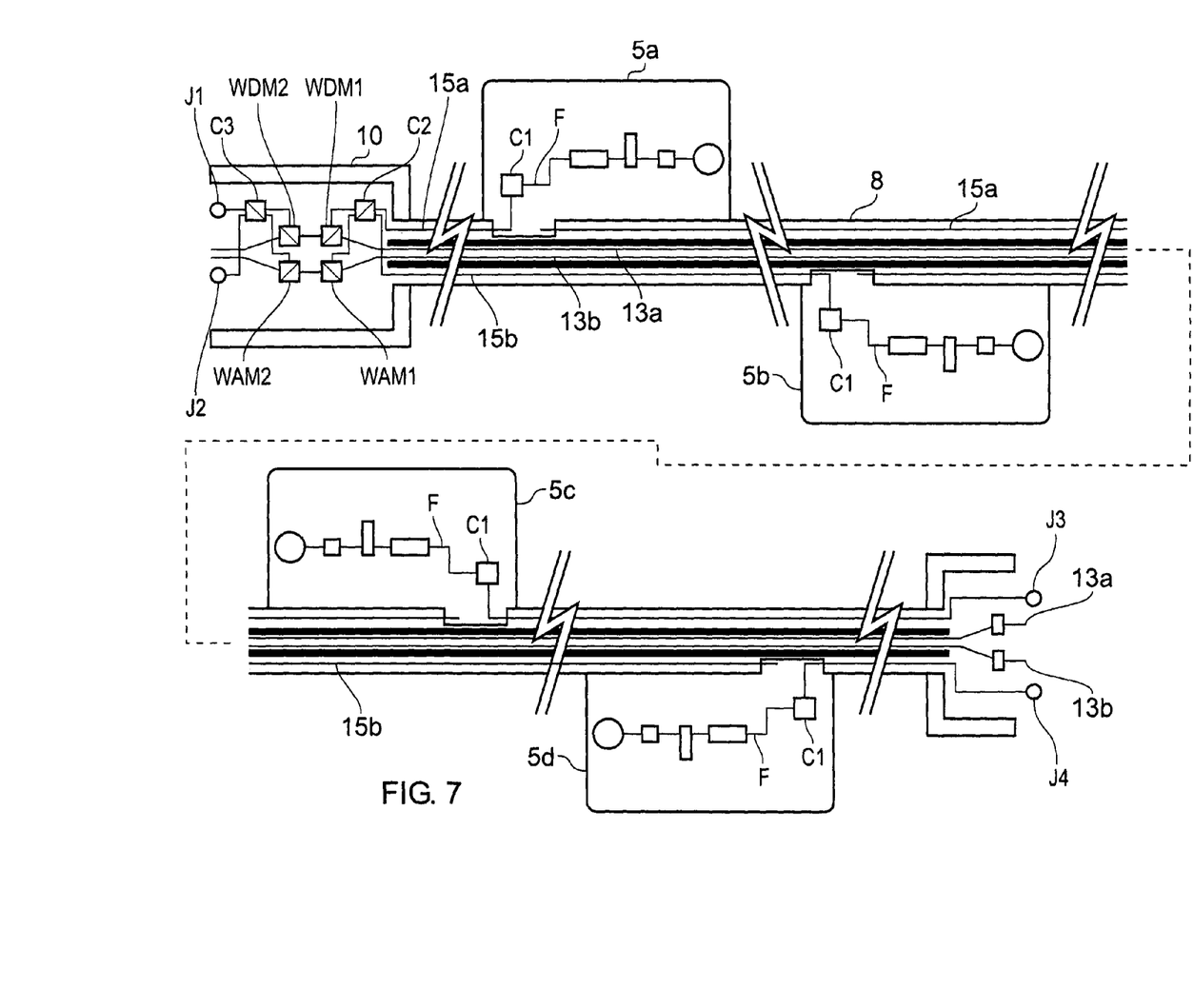
FIG. 7 is a schematic longitudinal sectional view of a third cable module according to the invention.

FIG. 7 illustrates a further embodiment of a seismic cable module, similar in appearance to the module described in relation to FIG. 4. However, the module of FIG. 7 includes two sensor units 5a and 5b of a first sector, and two sensor units 5c and 5d of a second sector. As is the case with FIG. 6, the internal detail of the sensor units is not shown in full, but substantially corresponds to that shown in FIG. 4.

In the module of FIG. 7, one end of the module has a combined connection and joining element 10, while the other end of the module has a joining element 9. The combined connection and joining element 10 houses two wavelength drop multiplexers WDM2 and WDM1, two wavelength add multiplexers WAM2 and WAM1, and two couplers C3 and C2.

Coupler C3 has one input connected to wavelength drop multiplexer WDM2, one input connected to wavelength add multiplexer WAM2, and two output connections J1 and J2 for joining to outer fibres 15a and 15b of an adjacent module.

Coupler C2 has one input connected to wavelength drop multiplexer WDM1, one input connected to wavelength add multiplexer WAM1, and two outputs connected to respective outer fibres 15a and 15b. From the coupler C2, each outer fibre 15a, 15b extends along the cable 8 to a sensor unit 5a, 5b respectively. At the sensor unit, the respective outer fibre 15a, 15b is joined by a coupler C1 to the optical fibre F of that sensor unit.

The joining element 9 at the other end of the cable 8 includes connections J3 and J4 for the respective outer fibres 15a and 15b. From the joining element 9, outer fibre 15a extends along cable 8 and is joined at a coupler C1 to the optical fibre F of the sensor unit 5c. As will be seen from the figure, outer fibre 15a joins sensor unit 5a to the coupler C2, and also joins sensor unit 5c to the connection J3 at the joining element 9. The part of the outer fibre 15a which extends between the sensor unit 5a and the sensor unit 5c is not used. Similarly, outer fibre 15b joins sensor unit 5b to the coupler C2, and also joins sensor unit 5d to the connection J4 at the joining element 9. The part of the outer fibre 15b which extends between the sensor unit 5b and the sensor unit 5d is not used.

When two modules of the type shown in FIG. 7 are joined together, the joining element 9 of one module is connected to the combined connection and joining element 10 of the other module. In making this connection, a joint is made between the connection points J1 and J3, and the connection points J2 and J4, as well as joining the core fibres 13a and 13b together. In operation, the module of FIG. 7 operates in a similar way to that shown in FIG. 6, with pulses of a first wavelength being stripped from the core fibre 13a by the wavelength drop multiplexer WDM2 and fed, via coupler C3 and connection points J1 and J2, to the sensor units 5c and 5d of the preceding module. Returning pulse trains from these sensor units are connected into the core fibre 13b by the wavelength add multiplexer WAM2. Pulses of a second wavelength are stripped from the core fibre 13a by the wavelength drop multiplexer WDM1 and fed, via coupler C2 to the sensor units 5a and 5b of the module. Returning pulse trains from these sensor units are connected into the core fibre 13b by the wavelength add multiplexer WAM1. It will be appreciated that sensor units 5c and 5d of this module will be supplied with pulses by the wavelength drop multiplexer WDM2 of the succeeding module, via its coupler C3 and the connection points J3 and J4.

To terminate a seismic cable made up from modules of this type, where at the end of a module does not correspond to the end of a sector of sensor units, the final module in the cable may include only the sensor units 5a and 5b, omitting the sensor units 5c and 5d. The final module will still require the wavelength drop multiplexer WDM2, the wavelength add multiplexer WAM2 and the coupler C3, in order to connect to the sensor units 5c and 5d of the previous module in the cable. At the "start" end of the cable, the wavelength drop multiplexer WDM2, the wavelength add multiplexer WAM2 and the coupler C3 will be unconnected.

In the embodiments shown in FIGS. 6 and 7, each connection point 10 includes the connection elements to join two sectors of sensor units into the core fibres. In the embodiment of FIG. 6, both of the sectors of sensor units are situated in the same cable module, while in the embodiment shown in FIG. 7 the two sectors of sensor units served by the connection element 10 are situated one in the module of the connection element 10, and one in a neighbouring module.

In an alternative arrangement of the embodiment shown in FIG. 7, each sector may contain eight or twelve sensor units, with four or six of its sensor units mounted on one module and four sensor units mounted on an adjacent module. The couplers C3 and C2 may then each have two inputs and eight or twelve outputs, with each output of the coupler C2 being joined to a respective outer fibre of the cable 8 of the module. Each output of the coupler C3 will be provided with a connection point J1, J2 etc for joining to a respective outer fibre of an adjacent cable module. Connections between outer fibres as well as connections between core fibres will thus be made at each connection between adjacent modules.

In further alternative embodiments, each sector may contain a plurality of sensor units, with a number of the sensor units mounted on one module and the remaining sensor units mounted on an adjacent module. The couplers C3 and C2 may then each have two inputs and a number of outputs corresponding to the number of sensor units in the sector, with each output of the coupler C2 being joined to a respective outer fibre of the cable 8 of the module. Each output of the coupler C3 will be provided with a connection point J1, J2 etc for joining to a respective outer fibre of an adjacent cable module.

Figure 8:
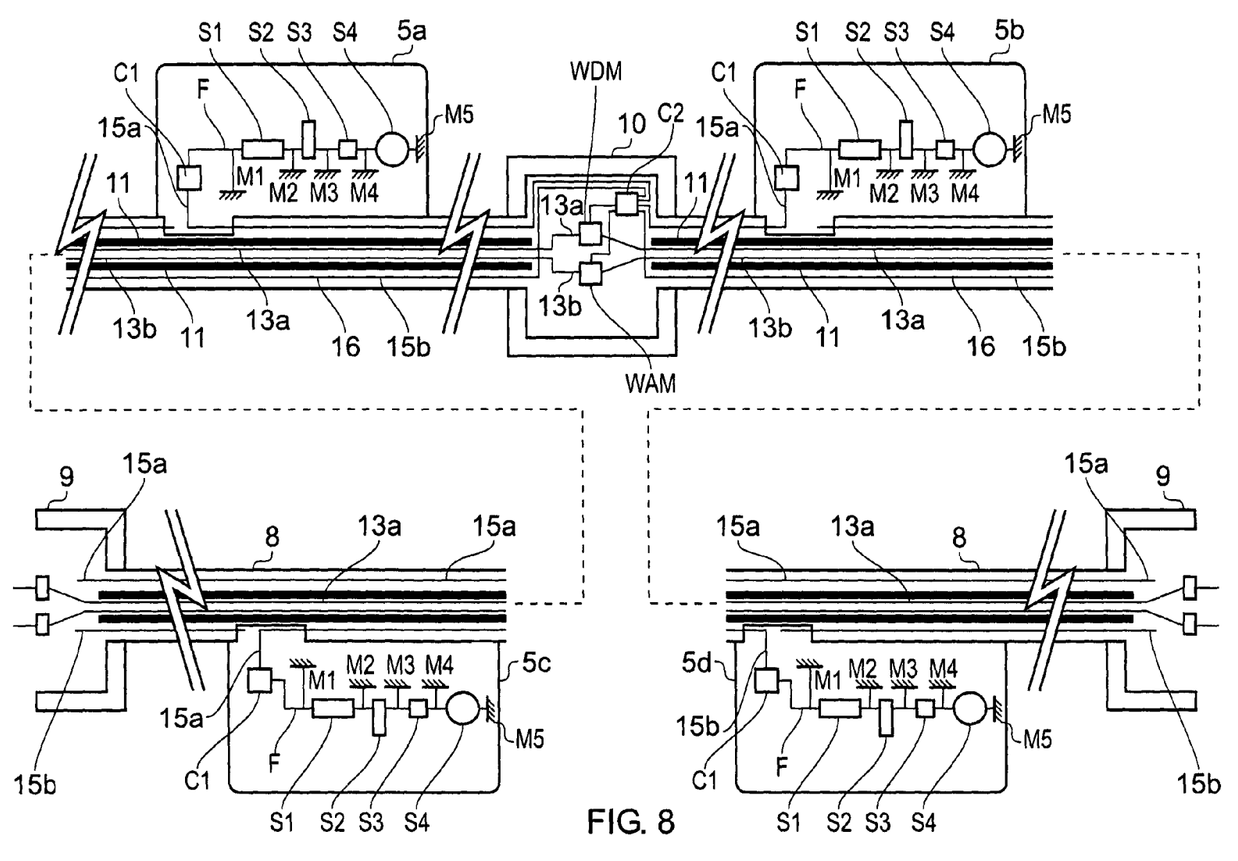
FIG. 8 is a schematic longitudinal sectional view of a fourth cable module according to the invention.

A further alternative structure for a seismic cable module is shown in FIG. 8. The module of FIG. 8 is constructed in the manner of the module illustrated in FIG. 5, but all of the sensor units 5 of this module are within the same sector. The module has joining elements 9 at its ends, in which the core fibres 13a and 13b are joined to the core fibres of adjacent modules. At a connection element 10 placed centrally in the module, a wavelength drop multiplexer WDM is connected to core fibre 13a, and a wavelength add multiplexer is connected to core fibre 13b. A coupler C2 is connected to both the wavelength drop multiplexer WDM and the wavelength add multiplexer WAM, and has four outputs. Two of the outputs are connected to outer fibre portions 15a and 15b extending to the right along the cable from the connection element 10, and the other two outputs are connected to outer fibre portions 15a and 15b extending to the left along the cable from the connection element 10. Outer fibre portion 15a extending to the left is connected to sensor unit 5a, and outer fibre portion 15b extending to the left is connected to sensor unit 5c. Outer fibre portion 15a extending to the right is connected to sensor unit 5b, and outer fibre portion 15b extending to the right is connected to sensor unit 5d.

Light pulses arriving along core fibre 13a are split off at wavelength drop multiplexer WDM and fed to coupler C2, from where pulses pass on down the outer core fibres to sensor units 5b and 5d, and pulses pass back up the cable 8 to sensor units 5a and 5c. Returning pulse trains from the four sensor units are separated in time, if necessary with the use of delay coils, and fed via the coupler C2 and wavelength add multiplexer WAM back into the core fibre 13b for transmission back to the operating system 6. With this module structure, the number of components at the connection element 10 is reduced to a minimum, and each cable module corresponds to a single sector of sensor units. It will also be noted that the joining elements 9 of the modules of this type require connections only to be made between core fibres of adjacent modules, no connection being made between the outer fibres of adjacent modules.

In the embodiments described, outer fibres connect the sensor units of each sector to a coupler, and core fibres connect to outer fibres via these couplers at one point only in a sector. This point may be at one end of the sector, or may be at any point within the length of the sector. To minimise the number of outer fibres needed to connect all of these sensors in a sector to a single coupler, a coupler may be provided centrally in the sector, so that a part of each outer fibre extending in a first direction from the coupler joins to a first sensor unit, and a part of the same outer fibre extending in the opposite direction from the coupler connects to a second sensor unit. The connection point may be situated at the end of a module, or at a point intermediate the length of the module, preferably a central point in the module. The connection point or unit may also be a sensor point or unit.

The number of sectors which can be completed on a single seismic cable is increased by increasing the number of different wavelengths of light provided in the light pulses applied to the core fibre 13a. Each sector may be served by a single wavelength of light, or if the sectors are sufficiently distantly spaced apart, two sectors may share the same wavelength since their returning pulse trains will be separated by a time interval corresponding to the length of cable between the two sectors.

Spatial multiplexing of returning signal pulse trains may also be effected by providing more fibre pairs in the cable core, and by connecting sectors to different fibre pairs within the core.

To optimise the detection of seismic signals there must be good mechanical coupling of the signals into the 4C station. For this to occur the effective density of the complete package should be similar to that of the sea bed in which it is deployed. The density of the sea bed varies slightly depending on the local geology, however typically the station should have a relative density (specific gravity) of from about 1.5 to about 2.5, preferably about 2.

The invention claimed is:

1. An optical seismic cable module comprising:
   a cable having:
      a substantially tubular strength element;
      a number of first optical fibres extending along a lumen of the strength element;
      a number of second optical fibres extending part-way along the cable module radially outboard of the strength element;
      a number of sensor units at which sensors are joined to the second optical fibres; and
      a joining device at each end of the cable module, each joining device providing a load path between the strength element of the cable module and the strength element of a respective adjacent cable module, and providing for the connection of one or more of the first optical fibres of the cable module to respective first optical fibres of the respective adjacent cable module;
   the seismic cable module further comprising a connection unit intermediate the length of the cable module at which at least one of the respective second optical fibres are joined to one of the first optical fibres of the cable module;
   wherein the sensor units on both sides of the connection unit are joined to that connection unit by the second optical fibres.

2. An optical seismic cable module according to claim 1, wherein the joining devices provide for connection between first optical fibres of adjacent cable modules and respective second optical fibres of adjacent modules.

3. An optical seismic cable module according to claim 1, wherein equal numbers of sensor units are provided on each side of the connection unit.

4. An optical seismic cable module according to claim 1, wherein:
   the connection unit is positioned intermediate the length of the cable module;
   the sensor units are positioned on each side of the connection unit;
   one of the respective second optical fibres extends from each sensor unit to the connection unit; and
   the strength element and the first optical fibres of the cable module extend continuously from the respective ends of the cable module to the connection unit.

5. An optical seismic cable module according to claim 1, wherein more than one of the sensor units are joined to each of the second optical fibres.

6. An optical seismic cable comprising:
   a number of cable modules according to claim 1,
   wherein the cable modules are joined end-to-end at the joining devices wherein the first optical fibres of one cable module are joined to the first optical fibres of the adjacent cable module; and
   the joining devices provide a load path between the strength elements of adjacent cable modules.

7. An optical seismic cable according to claim 6, wherein, in one of the cable modules, the respective second optical fibres extend from each of the sensor units to the connection unit.

8. An optical seismic cable according to claim 7, wherein, in one of the cable modules, the sensor units are positioned on each side of the connection unit.

9. An optical seismic cable according to claim 8, wherein, in one of the cable modules, equal numbers of sensor units are provided on each side of the connection unit.

10. An optical seismic cable module according to claim 1, wherein the respective ends of each module provide for module-to-module connection of first optical fibres, and also for module-to-module connection of second optical fibres.

* * * * *